(12) United States Patent
Takahashi et al.

(10) Patent No.: US 9,230,451 B2
(45) Date of Patent: Jan. 5, 2016

(54) TACTILE DISPLAY DEVICE

(75) Inventors: Isao Takahashi, Miyagi-ken (JP); Seigo Yamazaki, Iwate-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 572 days.

(21) Appl. No.: 13/607,501

(22) Filed: Sep. 7, 2012

(65) Prior Publication Data

US 2013/0004922 A1    Jan. 3, 2013

Related U.S. Application Data

(63) Continuation of application No. PCT/JP2010/054421, filed on Mar. 16, 2010.

(51) Int. Cl.
*G09B 21/00* (2006.01)
*G06F 3/01* (2006.01)

(52) U.S. Cl.
CPC .............. *G09B 21/004* (2013.01); *G06F 3/016* (2013.01)

(58) Field of Classification Search
None
See application file for complete search history.

(56) References Cited

U.S. PATENT DOCUMENTS

| | | | |
|---|---|---|---|
| 6,354,839 B1 * | 3/2002 | Schmidt et al. | 434/113 |
| 2004/0124384 A1 * | 7/2004 | Biegelsen et al. | 251/129.01 |
| 2007/0114116 A1 * | 5/2007 | Nagai et al. | 200/181 |
| 2009/0023116 A1 * | 1/2009 | Shaw | 434/114 |
| 2011/0012828 A1 * | 1/2011 | Nagai | G09B 21/003 345/156 |

FOREIGN PATENT DOCUMENTS

| | | |
|---|---|---|
| JP | 2001-147637 | 5/2001 |
| JP | 2007-71977 | 3/2007 |
| JP | 2007-79172 | 3/2007 |

OTHER PUBLICATIONS

International Search Report dated Jun. 8, 2010 from International Application No. PCT/JP2010/054421.
Hidekazu Takahashi, "Possility of Thin Braille Display, Tokyo University develops a 1-mm thick flexible Braille mechanism", Nikkei Byte, the Jan. issue, Dec. 22, 2005, No. 272, p. 6.

* cited by examiner

*Primary Examiner* — Brian Zimmerman
*Assistant Examiner* — Kevin Lau
(74) *Attorney, Agent, or Firm* — Beyer Law Group LLP

(57) ABSTRACT

Actuators are disposed between a lower wiring substrate and an upper wiring substrate. The actuators, the lower wiring substrate, and the upper wiring substrate are interposed between a lower frame and an upper frame. The end of each actuator is held between pushing parts of the lower frame and upper frame. The free ends of the actuators move projections upward that are displayed in a tactile display.

11 Claims, 6 Drawing Sheets

TACTILE DISPLAY DEVICE

CLAIM OF PRIORITY

This application is a Continuation of International Application No. PCT/JP2010/054421 filed on Mar. 16, 2010. The entire contents of each application noted above are hereby incorporated by reference.

BACKGROUND OF THE INVENTION

1. Field of the Invention

The present invention relates to a tactile display device having a tactile display constituted of a plurality of projections and, specifically, relates to a tactile display device that facilitates the wiring for actuators moving the projections.

2. Description of the Related Art

Tactile display devices with a tactile display from which projections selectively protrude are used as Braille cells, which are means for transmitting information for the visually impaired.

Japanese Unexamined Patent Application Publications Nos. 2001-147637 and 2007-71977 describe techniques related to Braille cells. Such a Braille cell has a plurality of holes in an area for contact that comes into contact with the user's finger. Detection pins are placed inside the holes in a retractable manner. Piezoelectric bimorph elements are provided as actuators. The piezoelectric bimorph elements are fixed at the ends, and the other ends are opposed to the bottom of the detection pins. At least one of the actuators is selected, and electricity is supplied thereto. Upon receiving electricity, the actuators bend, causing the corresponding detection pins to protrude due to the bending force of the actuators.

A predetermined number of detection pints, which each correspond to a Braille dot, represents a single Braille letter. Letter information can be obtained by running a finger across the Braille letter.

SUMMARY OF THE INVENTION

The actuators of the Braille cells described in Japanese Unexamined Patent Application Publications Nos. 2001-147637 and 2007-71977 are composed of piezoelectric bimorph elements, and each actuator includes piezoelectric elements that operate corresponding detection pins and stacked in a thickness direction. Thus, the thickness is significantly large.

Since the piezoelectric elements are stacked in the thickness direction, the electrodes of the piezoelectric elements have to be wired three-dimensionally. As a result, assembly is complicated, and a large space is required for wiring, causing an increase in the size of the apparatus.

The present invention solves the above-mentioned problems by providing a thin tactile display device that achieves the small thickness by a planar arrangement of flexible membrane actuators and that facilitates the wiring to the actuators.

The present invention provides a tactile display device including a casing including a lower frame and an upper frame attached to each other; a plurality of projections configured to protrude from the surface of the casing; and a plurality of membrane actuators configured to move the projections such that the projections protrude from the surface of the casing wherein the plurality of projections forms a tactile display, wherein each of the actuators has electrode layers disposed on upper and lower surfaces thereof and is displaceable in a thickness direction, the plurality of actuators are arranged in a plane such that the surfaces of the actuators intersect with a projection direction of the projections, lower pushing parts are disposed on the lower frame, upper pushing parts are disposed on the upper frame, a lower wiring substrate is interposed between ends of the actuators and the lower pushing parts, an upper wiring substrate is interposed between the ends of the actuators and the upper pushing parts, the ends of the actuators are interposed between the lower pushing parts and the upper pushing parts, and a plurality of electrodes disposed on the lower wiring substrate and a plurality of electrodes disposed on the upper wiring substrate are electrically connected to the electrode layers of the actuators.

The tactile display device according to the present invention has a thin casing because the membrane actuators are arranged on a plane intersecting with the projection direction of the projections. Driving signals can be applied to the electrode layers of the actuators through the use of a maximum of two substrates, i.e., the lower wiring substrate and the upper wiring substrate. Since flat wiring is possible, the space required for wiring in the casing is thin.

Since the lower wiring substrate and the upper wiring substrate are interposed between the lower pushing parts and the upper pushing parts and are pushed against the ends of the actuators, the electrodes of the lower pushing parts and the electrodes of the upper pushing parts can be disposed closely in contact with the electrode layers of the actuators. The electrodes of the lower pushing parts and upper pushing parts and the ends of the actuators are less likely to be misaligned even without bonding the upper wiring substrate and the upper frame and bonding the lower pushing part and the lower frame.

In the present invention, the lower wiring substrate and the upper wiring substrate may include flexible substrates, the lower wiring substrate and the upper wiring substrate may have deformable connecting parts, and the connecting parts may be interposed between the ends of the actuators and the lower pushing parts and between the ends of the actuators and the upper pushing parts.

The flexible lower wiring substrate and upper wiring substrate easily transmits the clamping force of the upper pushing parts of the upper frame and the lower pushing parts of the lower frame from the wiring substrate to the actuators, and thus, the actuators can be firmly held.

In the present invention, it is preferable that at least one of the lower frame and the upper frame be integrated with a resilient part, and the lower pushing parts or the upper pushing parts be disposed on the resilient part.

With the above-described structure, the ends of the actuators, the lower wiring substrate, and the upper wiring substrate are held between the lower pushing parts and the upper pushing parts by a resilient force. The deformation of the resilient parts absorbs errors in the sizes of the various parts in the cases and the sizes of the ends of the actuators. The actuators are stably held even when the actuators are driven and when an external force acts upon the actuators.

In the present invention, a plurality of storage parts may be disposed on at least one of the lower frame and the upper frame, and the actuators may be disposed inside the storage parts such that the movement of the actuators is limited in the width direction.

With the above-described structure, relatively small membrane actuators can be positioned inside storage parts for assembly. Thus, assembly is easy.

In the present invention, an area of the lower pushing parts holding the ends of the actuators preferably differs from an area of the upper pushing parts holding the ends of the actuators.

With the above-described configuration, a reduction in the opposing areas of the upper pushing parts and the lower pushing parts can be easily prevented even if the relative positions of the upper pushing parts and the lower pushing parts are displaced in the surface direction of the actuators, and problems can be solved, such as the jamming of an actuator between the corresponding displaced upper pushing part and the corresponding lower pushing part.

In the present invention, the area of the lower pushing parts holding the ends of the actuators may be larger than the area of the upper pushing parts holding the ends of the actuators.

With the above-described configuration, the resistance of the clamping structure of each end can be reduced when the actuators deform in a direction pushing the projections.

In the present invention, for example, the actuators are polymeric actuators containing ionic liquid.

In such a case, it is preferable that the electrodes have conductive layers containing carbon. If each electrode has a conductive layer containing carbon, the contact resistance with the corresponding polymer actuator can be reduced, and the contact resistance can be maintained because the electrode is chemically stable. The contact resistance can be especially reduced when the electrode layers of the polymer actuators are composed of carbon materials. The metal wiring layers of the wiring substrates can be prevented from coming into direct contact with the polymer actuators, and the ionic liquid easily prevents the wiring layer from altering.

The membrane actuators according to the present invention is not limited to a polymer actuator and, instead, may be other soft actuators or piezoelectric elements.

The lower wiring substrate and the upper wiring substrate according to the present invention are independent substrates. Instead, the lower wiring substrate and the upper wiring substrate may be one body composed of a flexible substrate.

The tactile display device according to the present invention can have a small thickness and can be handled easily. The structure of the wires to the actuators can be simplified, and the space in the casing required for wiring can be extremely thin.

DESCRIPTION OF THE PREFERRED EMBODIMENTS

A tactile display device 1 according to an embodiment of the present invention is used as a Braille cell that provides information to the visually impaired.

Figure 1:
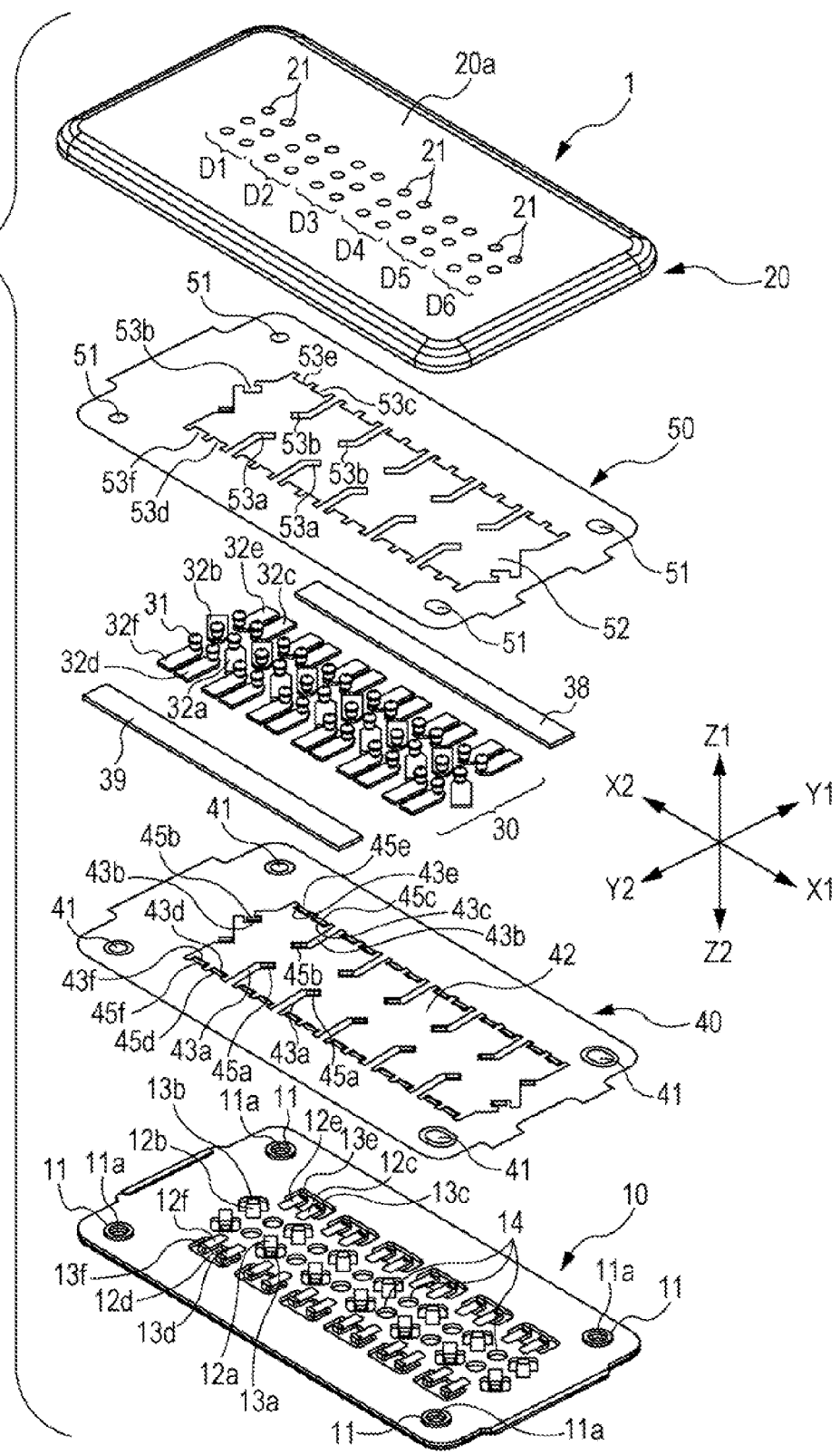
FIG. 1 is an exploded perspective view of a tactile display device according to an embodiment of the present invention.

As illustrated in FIG. 1, the tactile display device 1 is a thin casing constituted of a lower frame 10 and an upper frame 20 attached to each other. A dot driving unit 30 is disposed in the middle part in the thickness direction of the casing.

The dot driving unit 30 is interposed between a lower wiring substrate 40 and an upper wiring substrate 50 and is accommodated inside the casing. The lower frame 10 and the upper frame 20 are both composed of synthetic resin and are fixed to each other with a plurality of fixing screws.

Figure 2:
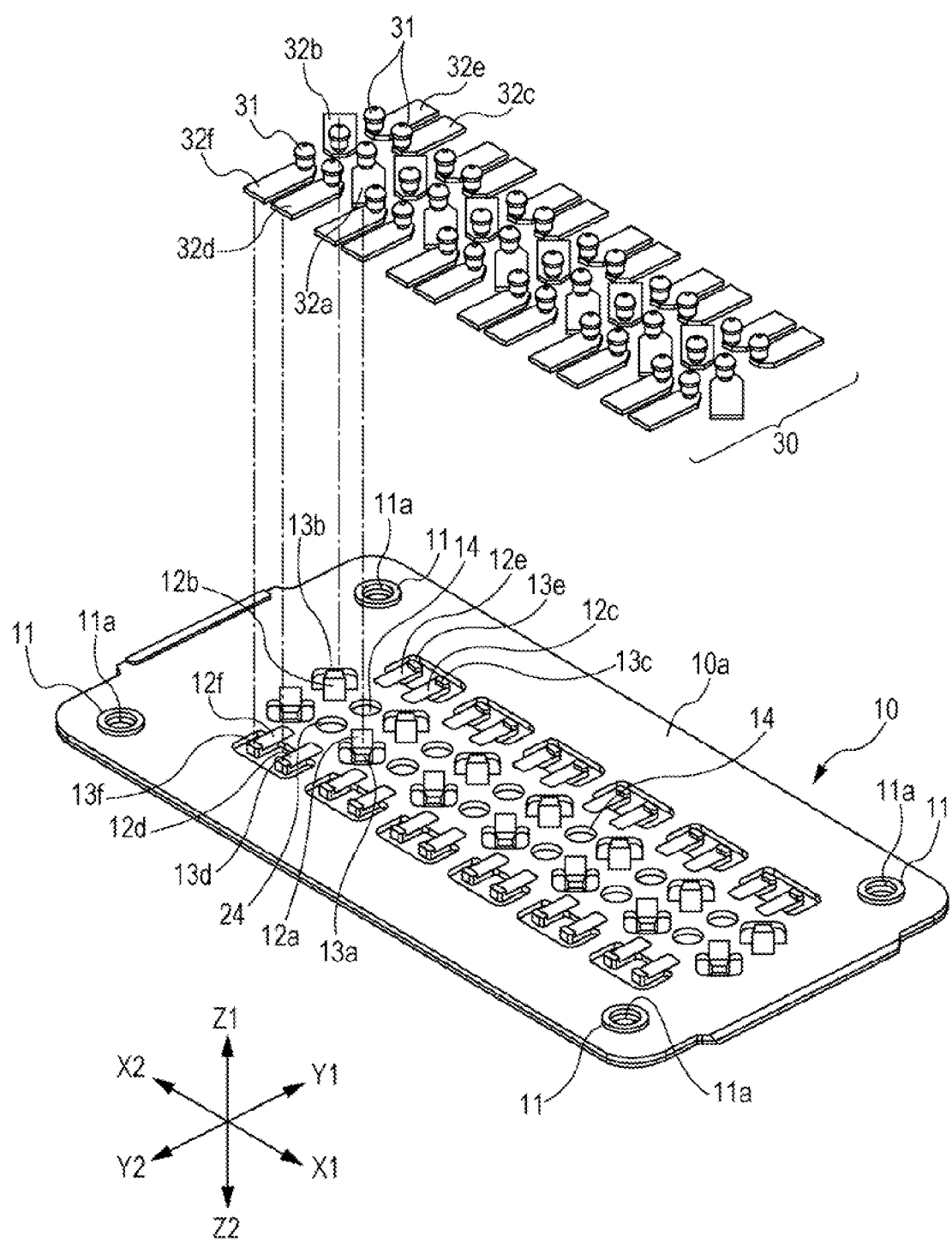
FIG. 2 is a partial perspective view of a lower frame, a plurality of actuators, and a plurality of projections constituting the tactile display device.
Figure 3:
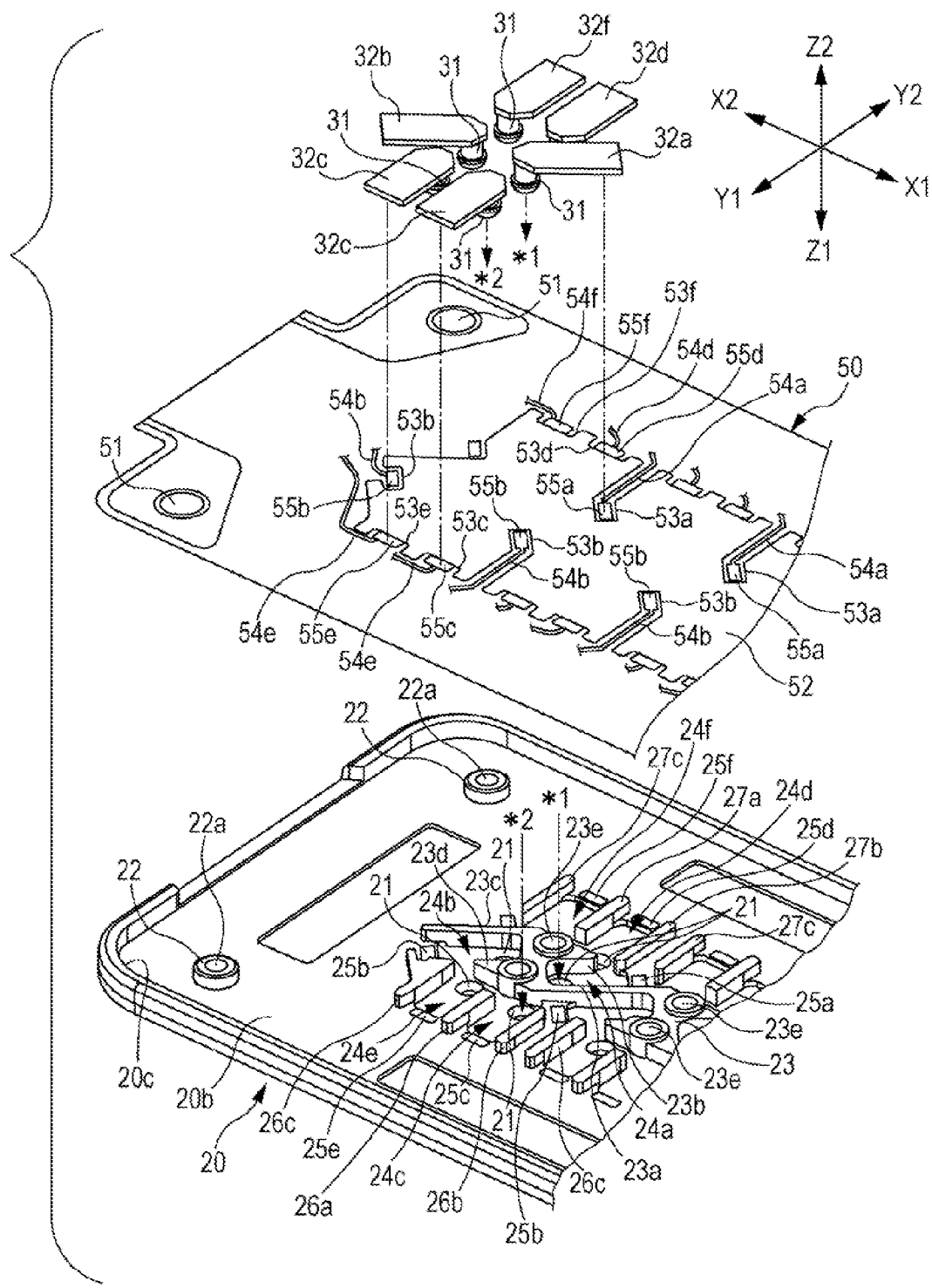
FIG. 3 is a partial perspective view of the tactile display device vertically inverted to show the upper frame, the actuators, the projections, and the upper wiring substrate.
Figure 4:
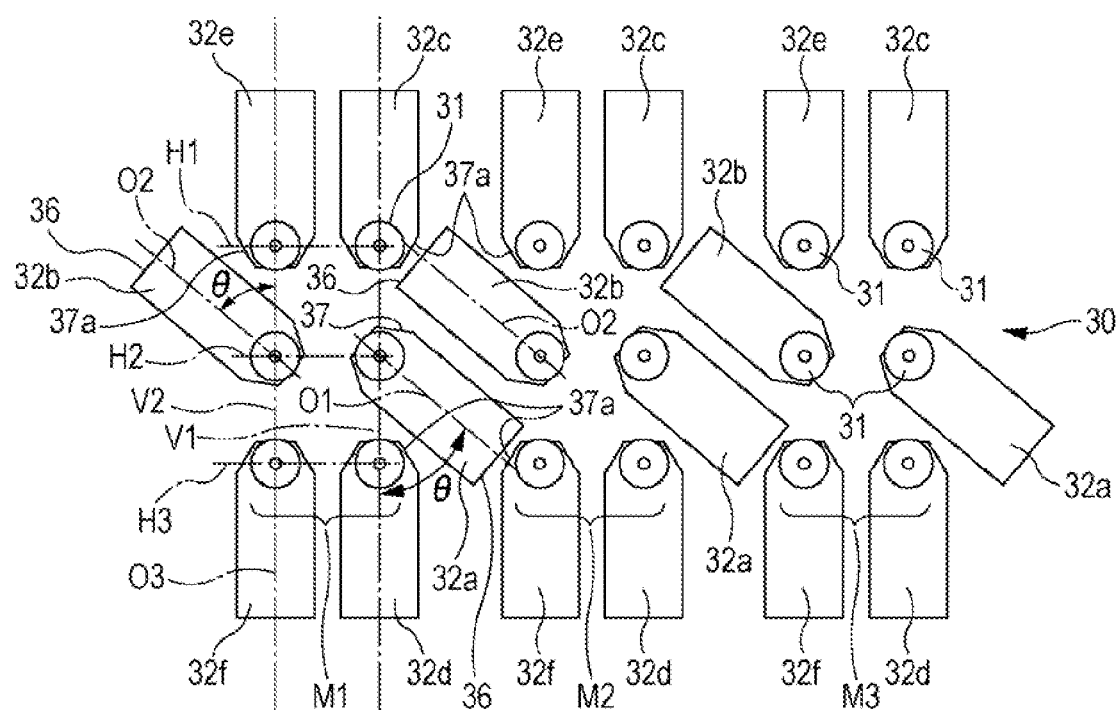
FIG. 4 is a plan view of the arrangement of the projections and the actuators.

FIG. 2 illustrates the positional relationship of the dot driving unit 30 and the lower frame 10, and FIG. 3 illustrates the positional relationship of the dot driving unit 30, the upper frame 20, and the upper wiring substrate 50. FIG. 4 is a plan view of the arrangement of the dot driving unit 30.

Figure 5:
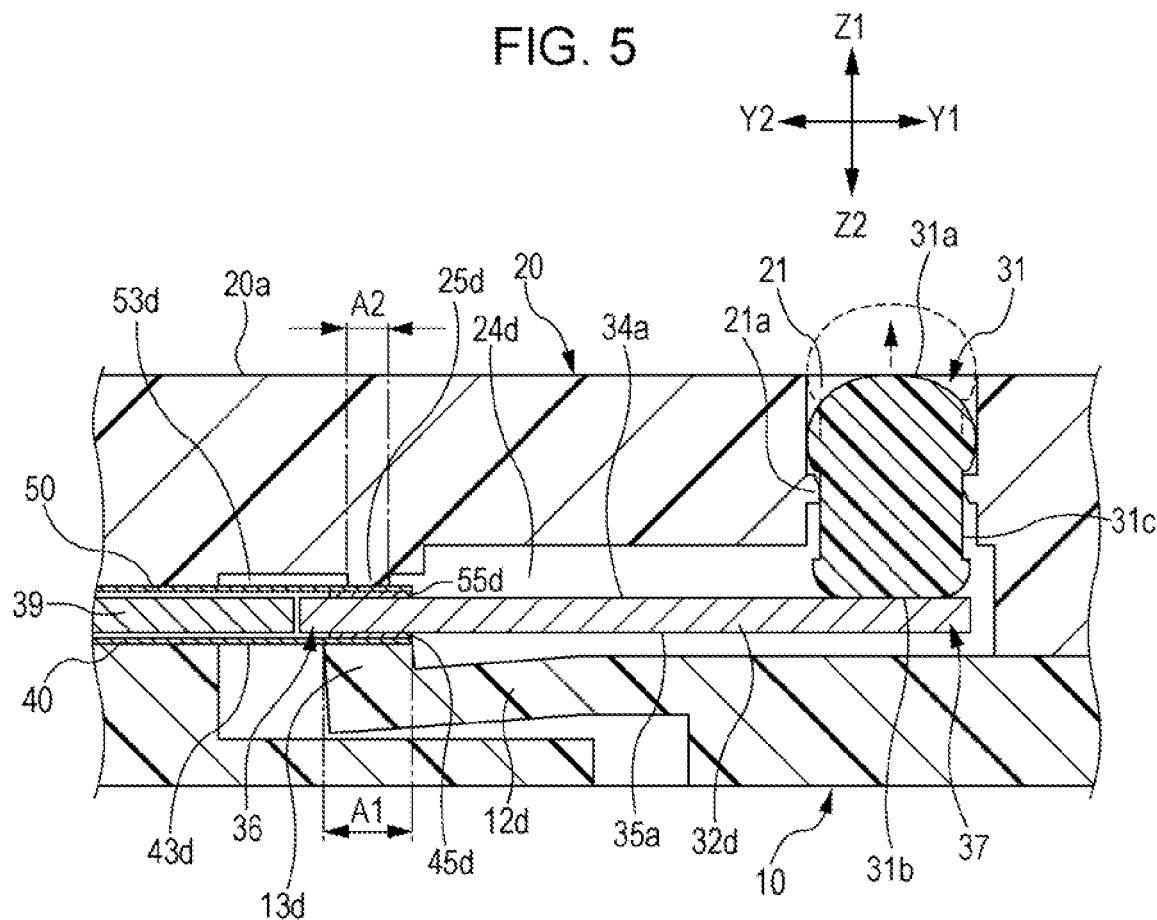
FIG. 5 is a partial sectional view of the tactile display device.

As illustrated in FIG. 4, the dot driving unit 30 includes a plurality of projections 31. The projections 31 are composed of synthetic resin. As illustrated in FIG. 5, each projection 31 has a contact part 31a, which is a curved tip area facing the Z1 direction, i.e., the projection direction, and a pushed part 31b, which is the end portion facing the Z2 direction, i.e., the retraction direction, and receiving projection pressure. An engagement groove 31c having a predetermined width in the Z1-Z2 direction is formed in the middle area of the circumference of the projection 31.

As illustrated in FIGS. 1 and 3, multiple holes 21 are formed along the vertical direction in the upper frame 20. As illustrated in FIG. 5, the holes 21 in the upper frame 20 have a diameter that allows the corresponding projection 31 to move in the Z1-Z2 direction. A ring-shaped support rib 21a protrudes inward from the inner circumferential surface of each hole 21 at the middle part in the Z1-Z2 direction. The engagement groove 31c and the support rib 21a engage with each other as a result of forcefully inserting the projection 31 in the Z1 direction from the inner side of the upper frame 20 into the corresponding hole 21, preventing the projection 31 from falling out of the hole 21. The projection 31 is movable in the Z1-Z2 direction inside the hole 21 within the width of the engagement groove 31c.

Instead of the configuration illustrated in FIG. 5, a rib may be formed on the outer circumferential surface of each projection 31 and an engagement groove having a predetermined width may be formed on the inner circumferential surface of the corresponding hole 21 in the Z1-Z2 direction.

As illustrated in FIG. 1, the surface of the upper frame 20 is a contact surface 20a that is to be touched with a finger. The holes 21 are formed in the contact surface 20a in groups of six. Six holes 21 constitute a first display section D1, and another six holes 21 constitute a second display section D2. Similarly, a third display section D3, a fourth display section D4, a fifth display section D5, and a sixth display section D6 are provided.

As illustrated in FIG. 4, six projections 31 constitute a first dot matrix M1 in the dot driving unit. The projections 31 in the first dot matrix M1 are fit into the corresponding holes 21 in the first display section D1. The xix projections 31 in a second dot matrix M2 are fit into the corresponding holes 21 in the second display section D2. Similarly, the projections 31 constituting a third dot matrix M3, a fourth dot matrix M4, a fifth dot matrix M5, and a sixth dot matrix M6 are fit into the corresponding holes 21 in the third display section D3, the fourth display section D4, the fifth display section D5, and the sixth display section D6, respectively.

One dot matrix represents one Braille letter. The user can obtain information in sequence on six different Braille letters by running his/her finger across the contact surface 20a of the upper frame 20 in the X1 direction.

As illustrated in FIG. 4, in the first dot matrix M1, a first column V1 and a second column V2 extending in the Y1-Y2 direction each include three projections 31. Thus, rows H1, H2, and H3 extending in the X1-X2 direction each include two projections 31. Accordingly, the first dot matrix M1 includes six projections 31. The projections 31 in the columns V1 and V2 are arranged at equal intervals, and the projections 31 in the rows H1, H2, and H3 are also arranged at equal intervals. Thus, the pitch in the columns and rows are the same. The projections 31 are arranged in the same manner in the second dot matrix M2, third dot matrix M3, and so on.

As illustrated in FIG. 4, the dot matrices M1, M2, M3, and so on each include six actuators 32 corresponding to the six projections 31. Although the actuators 32 disposed at different positions are designated by reference numerals 32a, 32b, 32c, 32d, 32e, and 32f, the actuators 32a to 32f are identical in structure and size.

Figure 6:
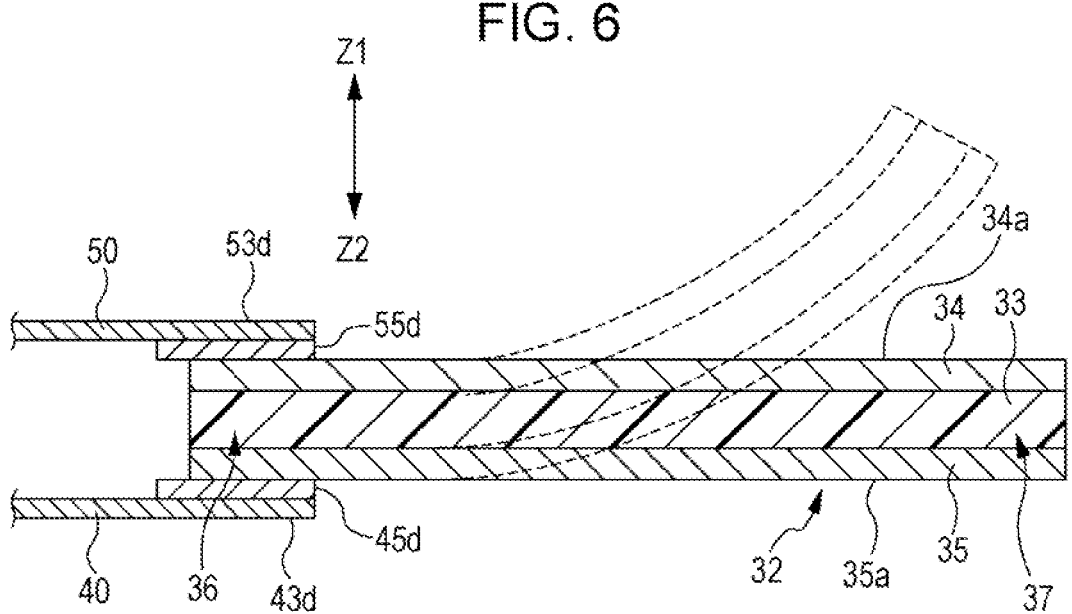
FIG. 6 illustrates the structure and operation of the actuators.

FIG. 6 illustrates a sectional view of the structure of one of the actuators 32. The actuator 32 includes a membrane electrolyte layer 33, a first electrode layer 34 deposited over the Z1 side of the electrolyte layer 33, and a second electrode layer 35 deposited over the Z2 side of the electrolyte layer 33. The electrolyte layer 33 includes polymers, such as polyvinylidene fluoride (PVDF) or polymethylmethacrylate (PMMA), incorporating ionic liquid. The first electrode layer 34 and the second electrode layer 35 contain polymers incorporating ionic liquid and conductive filler. The main component of the conductive filler is a carbon material, such as carbon nanotubes.

In the actuator 32, the plate surface 34a of the first electrode layer 34 is exposed on the Z1 side, and the plate surface 35a of the second electrode layer 35 is exposed on the Z2 side. The length and width of the plate surface 34a and the plate surface 35a of the actuator 32 are sufficiently greater than the thickness of the actuator 32.

For example, if there is a potential difference across the first electrode layer 34 and the second electrode layer 35 and the number of cations in the electrolyte layer 33 is larger than the number of anions, the cations are deflected toward the second electrode layer 35 if the first electrode layer 34 is positively charged, and thus, the second electrode layer 35 swells largely. As illustrated in FIG. 6, the actuator 32 bends such that it projects toward the Z1 side. Each actuator 32 has a fixed end 36 and a tip 37 opposing the pushed part 31b of the corresponding projection 31. As indicated by the dotted line in FIG. 6, when the actuator 32 bends, the corresponding projection 31 is pushed upward by the tip 37. As indicated by the dotted line in FIG. 5, the contact part 31a of the projection 31 protrudes in the Z1 direction further than the contact surface 20a of the upper frame 20.

FIG. 4 illustrates the category and arrangement of the six actuators 32 in the first dot matrix M1. The category and arrangement of the actuators 32 are the same for other dot matrices M2, M3, and so on.

As illustrated in FIG. 4, six actuators 32 that are identical in shape and size are arranged in the first dot matrix M1. By using actuators 32 identical in shape and size, the projections 31 in a single dot matrix protrude by the same amount.

The first middle actuator 32a opposes the corresponding projection 31 at the middle in the first column V1, and the second middle actuator 32b opposes the projection 31 at the middle in the second column V2. The first end actuator 32c opposes the projection 31 at the Y1 end in the first column V1, and the second end actuator 32d opposes the projection 31 at the Y2 end in the first column V1. In the second column V2, the third end actuator 32e opposes the projection 31 at the Y1 end, and the fourth end actuator 32f opposes the projection 31 at the Y2 end.

As illustrated in FIG. 4, the center axis O1 extending from the end 36 to the tip 37 of the first middle actuator 32a intersects with the first column V1 at an angle $\theta$ between 0 and 90 degrees. The end 36 of the first middle actuator 32a protrudes in the X1 direction further than the X1 sides of the first end actuator 32c and second end actuator 32d. Similarly, the center axis O2 of the second middle actuator 32b tilts at the angle $\theta$ from the second column V2. The end 36 of the second middle actuator 32b protrudes in the X2 direction further than the X2 sides of the third end actuator 32e and fourth end actuator 32f.

The obliquely arranged first middle actuator 32a and the second middle actuator 32b prevent the Y1-Y2 pitch of the three projections 31 in the first column V1 and the three projections 31 in the second column V2 from increasing unnecessarily. Moreover, the middle actuators 32a and 32b can be configured with a large width.

As illustrated in FIG. 4, in each dot matrix, the center axis O1 of the first middle actuator 32a and the center axis O3 of the fourth end actuator 32f in the second column V2 intersect at the angle $\theta$. Thus, a large space for disposing the second end actuator 32d can be provided between the first middle actuator 32a and the fourth end actuator 32f, allowing a large width of the second end actuator 32d. Similarly, the center axis O2 of the second middle actuator 32b and the center axis of the first end actuator 32c intersect at the angle $\theta$. Thus, a large space for disposing the third end actuator 32e can be provided, allowing a large width of the third end actuator 32e.

As illustrated in FIG. 4, each actuator 32 has two cut-off parts 37a, where two of the corners of the tip 37 are cut off. Since one of the cut-off parts 37a of the second end actuator 32d opposes the one of the sides of the first middle actuator 32a, the widths of the first middle actuator 32a and second end actuator 32d can be increased while the projections 31 are disposed close to each other along the first column V1. Similarly, one of the cut-off parts 37a of the tip 37 of the third end actuator 32e opposes one of the sides of the second middle actuator 32b. Thus, the widths of the second middle actuator 32b and third end actuator 32e can be increased while the projections 31 are disposed close to each other along the second column V2.

The cut-off parts 37a illustrated in FIG. 4 are formed by cutting off the corners of the tip 37 of an actuator in an oblique straight line. However, the cut-off parts 37a may have a different shape. That is, a cut-off part may have any shape, such as square notches, circular notches, or any other curved notches, so long as it is possible to dispose the cut-off part close to the end 36 of another actuator. The notches may be shaped as a polygon.

As described above, the intervals between the projections 31 in a single dot matrix does not have to be increased unnecessarily, and the dots to be displayed can be disposed at a pitch conforming to Braille standards. Moreover, the widths of the actuators 32a, 32b, 32c, 32d, 32e, and 32f can be increased, and the driving force of the actuators can be increased.

In adjacent dot matrices M1 and M2, the first middle actuator 32a of the first dot matrix M1 and the second middle actuator 32b of the second dot matrix M2 extend obliquely to the columns and rows. The center axis O1 of the first middle actuator 32a and the center axis O2 of the second middle actuator 32b are parallel to each other, and the first middle actuator 32a and the second middle actuator 32b are aligned along the column direction, i.e., the Y1-Y2 direction. As a result, the adjacent dot matrices M1 and M2 do not have to be disposed apart in the X direction, and the distance between the adjacent matrices can be optimized to conform to the Braille standards.

The end 36 of the first middle actuator 32a opposes one of the cut-off parts 37a of the fourth end actuator 32f in the adjacent dot matrix, and the end 36 of the second middle actuator 32b opposes one of the cut-off parts 37a of the first end actuator 32c in the adjacent dot matrix. In this way, the length of the middle actuators 32a and 32b can be increased while adjacent dot matrices are disposed at an optimal distance apart from each other in the X direction. As a result, the length of every actuator 32 can be increased, enabling a large protrusion stroke of the projections 31.

As illustrated in FIG. 5, the first electrode layer 34 and the second electrode layer 35 at the end 36 of each actuator 32 are interposed between an upper wiring substrate 50 and a lower wiring substrate 40. The actuator 32, the upper wiring substrate 50, and the lower wiring substrate 40 are interposed between the upper frame 20 and the lower frame 10.

FIG. 3 illustrates the upper frame 20 in a vertically inverted state. A flat ceiling 20b is formed on the lower side (Z2 side) of the upper frame 20, and a sidewall 20c surrounding the ceiling 20b is integrated with the outer circumference of the upper frame 20 in the downward direction (Z2 direction). Positioning protrusions 22, which protrude downward from the ceiling 20b, are integrated with the four corners of the upper frame 20. Internal threads 22a are formed in each of the positioning protrusions 22.

A center protrusion 23 protruding downward (in the Z2 direction) from the ceiling 20b is integrated with the upper frame 20 at the middle in the width direction (Y1-Y2 direction).

The center protrusion 23 has an oblique guide 23a, which tilts from the X and Y directions, and an opposing guide 23b, which opposes the oblique guide 23a. The area interposed between the oblique guide 23a and the opposing guide 23b serves as a first middle storage part 24a. One of the holes 21 is formed at one of the ends of the first middle storage part 24a. An upper pushing part 25a protrudes form the end opposite to the hole 21. Similarly, an oblique guide 23c, which tilts from the X and Y directions, and an opposing guide 23d are integrated with the center protrusion 23. A second middle storage part 24b is provided in the area interposed between the oblique guide 23c and the opposing guide 23d. Although one of the holes 21 is formed at one of the ends of the second middle storage part 24b, and an upper pushing part 25b is integrated with and protrudes form the other end.

Two internal threads 23e and 23e are formed in the area interposed between the first middle storage part 24a and the second middle storage part 24b of the center protrusion 23.

Three end guide protrusions 26a, 26b, and 26c are provided downward on the Y1 side of the upper frame 20 across from the center protrusion 23 along the X direction at predetermined intervals, and three end guide protrusions 27a, 27b, and 27c are provided on the Y2 side along the X direction at predetermined intervals.

A first end storage part 24c is interposed between an end guide protrusion 26a and an end guide protrusion 26b. A hole 21 is formed at the Y2 end part of the first end storage part 24c, and an upper pushing part 25c is provided at the Y1 end part. A second end storage part 24d is interposed between an end guide protrusion 27a and an end guide protrusion 27b. Another one of the holes 21 is formed at the Y1 end part of the second end storage part 24d, and an upper pushing part 25d is provided at the Y2 end part. A third end storage part 24e is interposed between the end guide protrusion 26a and the end guide protrusion 26c. The third end storage part 24e has another one of the holes 21 and an upper pushing part 25e. A fourth end storage part 24f is interposed between the end guide protrusion 27a and the end guide protrusion 27c. The fourth end storage part 24f has another one of the holes 21 and an upper pushing part 25f.

The upper wiring substrate 50 is a synthetic resin-based flexible substrate. As illustrated in FIG. 3, a long notch 52 extending in the X direction is formed at the center part of the upper wiring substrate 50. By mounting the upper wiring substrate 50 in contact with the ceiling 20b of the upper frame 20, the center protrusion 23, the end guide protrusions 26a, 26b, and 26c, and the end guide protrusions 27a, 27b, and 27c are positioned inside the notch 52.

As illustrated in FIG. 3, the upper wiring substrate 50 has a first middle connecting part 53a and a second middle connecting part 53b, which are integrated with the upper wiring substrate 50 and extend into of the notch 52. The first middle connecting part 53a and the second middle connecting part 53b are disposed along the X direction with a gap therebetween. A lead 54a is disposed on the Z2-side lower surface of the first middle connecting part 53a. An electrode 55a is formed at the tip of the lead 54a. Similarly, a lead 54b is disposed on the lower surface of the second middle connecting part 53b. An electrode 55b is formed at the tip of the lead 54b.

As illustrated in FIG. 3, the upper wiring substrate 50 has a first end connecting part 53c and a third end connecting part 53e, which protrude from the Y1 edge of the notch 52 into of the notch 52. Similarly, a lead 54c is disposed on the Z2-side lower surface of the first end connecting part 53c. An electrode 55c is formed at the tip of the lead 54c. Similarly, a lead 54e is disposed on the lower surface of the third end connecting part 53e. An electrode 55e is formed at the tip of the lead 54e. A second end connecting part 53d and a fourth end connecting part 53f are formed at the Y2 edge of the notch 52. A lead 54d is disposed on the lower surface of the second end connecting part 53d. An electrode 55d is formed at the tip of the lead 54d. A lead 54f is disposed on the lower surface of the fourth end connecting part 53f. An electrode 55f is formed at the tip of the lead 54f.

The leads 54a, 54b, 54c, and so on may be copper and silver patterns. The electrodes 55a, 55b, 55c, and so on each include a conductive layer composed of a binder resin containing carbons, such as carbon nanotubes and/or carbon graphite. The electrodes 55a, 55b, 55c, and so on are disposed over lands integrated with the corresponding leads 54a, 54b, 54c, and so on.

As illustrated in FIGS. 1 and 3, positioning holes 51 are formed at the four corners of the upper wiring substrate 50. The positioning holes 51 engage with the corresponding positioning protrusions 22 on the upper frame 20 such that the upper wiring substrate 50 is positioned on the upper frame 20 and is disposed in contact with the ceiling 20b.

By mounting the upper wiring substrate 50 on the ceiling 20b of the upper frame 20, every first middle connecting part 53a on the upper wiring substrate 50 fits between the corresponding end guide protrusion 27b and the adjacent end guide protrusion 27c of the upper frame 20, and the electrode 55a at the tip is disposed over the corresponding upper pushing part 25a of the upper frame 20. Every second middle connecting part 53b fits between the corresponding end guide protrusion 26a and the end guide protrusion 26c, and the electrode 55b at the tip is disposed over the corresponding upper pushing part 25b. The second middle connecting part 53 positioned at the X2 end is not interposed between end guide protrusions, and the electrode 55b at the tip is disposed over the upper pushing part 25b.

The electrode 55c mounted on the first end connecting part 53c of the upper wiring substrate 50 is disposed over the upper pushing part 25c of the upper frame 20. Similarly, the electrode 55d of the second end connecting part 53d is disposed over the upper pushing part 25d; the electrode 55e of the third end connecting part 53e is disposed over the upper pushing part 25e; and the electrode 55f of the fourth end connecting part 53f is disposed over the upper pushing part 25f.

After all projections 31 are fit into the corresponding holes 21, and the upper wiring substrate 50 is mounted on the ceiling 20b of the upper frame 20, the actuators 32 are attached to the upper frame 20. The first middle actuator 32a is stored in the first middle storage part 24a of the upper frame 20. At this time, the plate surface 34a (see FIG. 6) of the end 36 of the first middle actuator 32a is in contact with the electrode 55a of the first middle connecting part 53a. The tip 37 of the first middle actuator 32a contacts the pushed part 31b of the corresponding projection 31.

The first middle actuator 32a is roughly positioned between the oblique guide 23a and the opposing guide 23b such that it can be easily mounted to the upper frame 20. Parts other than the end 36 and the tip 37 of the first middle actuator 32a are disposed such that they are preferably not in contact with the oblique guide 23a, the opposing guide 23b, and other components and such that sliding resistance does not occur during driving.

The second middle actuator 32b is stored in the second middle storage part 24b of the upper frame 20. In this state, the plate surface 34a of the end 36 is in contact with the electrode 55b mounted on the second middle connecting part 53b of the upper wiring substrate 50, and the tip 37 is in contact with the corresponding pushed part 31b of the projection 31.

The first end actuator 32c is mounted in the first end storage part 24c of the upper frame 20. The plate surface 34a of the end 36 is in contact with the electrode 55c of the first end connecting part 53c of the upper wiring substrate 50. The tip 37 of the first end actuator 32c is in contact with the corresponding pushed part 31b of the projection 31. Similarly, the second end actuator 32d is mounted in the second end storage part 24d; the third end actuator 32e is mounted in the third end storage part 24e; and the fourth end actuator 32f is mounted in the fourth end storage part 24f. The plate surfaces 34a of the ends 36 of the end actuator 32d, 32e, and 32f are in contact with the electrodes 55d, 55e, and 55f, respectively. The tip 37 is in contact with the pushed part 31b of each projection 31.

The end actuators 32c, 32d, 32e, and 32f are fit between the corresponding end guide protrusions 26a, 26b, 26c, 27a, 27b, and 27c, facilitating the mounting to the upper frame 20. The parts other than the ends 36 and the tips 37 of the end actuators 32c, 32d, 32e, and 32f are attached such that they preferably do not come into contact with the end guide protrusions 26a, 26b, 26c, 27a, 27b, and 27c and other members.

FIG. 5 is a sectional view of the second end actuator 32d in an attached state.

As illustrated in FIG. 1, the dot driving unit 30 has a base-side positioning member 38 on the Y1 side and a base-side positioning member 39 on the Y2 side. The base-side positioning member 38 is disposed further in the Y1 direction than the end guide protrusions 26a, 26b, and 26c, which are illustrated in FIG. 3, and the base-side positioning member 39 is disposed further in the Y2 direction than the end guide protrusions 27a, 27b, and 27c. As illustrated in FIG. 5, the base-side positioning member 39 sets the position of the second end actuator 32d on the fixed end side, preventing the second end actuator 32d from moving in the Y2 direction from the second end storage part 24d. The base-side positioning member 39 limits the movement of the fourth end actuator 32f in the fourth end storage part 24f. The base-side positioning member 38 sets the position of the first end actuator 32c on the fixed end side, prevents the first end actuator 32c from moving out from the first end storage part 24c, and prevents the third end actuator 32e from moving out of the third end storage part 24e.

As illustrated in the enlarged view in FIG. 2, the lower frame 10 has positioning units 11 at the four corners. The positioning units 11 are ring-shaped and fit together with the corresponding positioning protrusions 22 on the upper frame 20, which are illustrated in FIG. 3. Each of the positioning units 11 on the lower frame 10 has a fixing hole 11a for passing a fixing screw vertically through the lower frame 10.

As illustrated in FIG. 2, the upper (Z1 side) surface of the lower frame 10 is a flat bottom surface 10a. The lower frame 10 has a first middle resilient part 12a. The end of the first middle resilient part 12a is integrated with the lower frame 10, and the free end resiliently deforms in the vertical direction (Z1-Z2 direction). A lower pushing part 13a is integrated with the free end. The lower frame 10 has a second middle resilient part 12b, and a lower pushing part 13b is integrated with the free end. The first middle resilient part 12a and the second middle resilient part 12b are disposed obliquely to the X and Y directions.

The lower frame 10 has a first end resilient part 12c and a third end resilient part 12e on the Y1 side. The free end of the first end resilient part 12c has a lower pushing part 13c, and the third end resilient part 12e has a lower pushing part 13e. A second end resilient part 12d and a fourth end resilient part 12f are disposed on the Y2 side. A lower pushing part 13d and a lower pushing part 13f are formed on the free ends of the second end resilient part 12d and the fourth end resilient part 12f, respectively.

As illustrated in FIG. 2, the lower frame 10 has a plurality of paired fixing holes 14, each of which is surrounded with the resilient parts.

The lower wiring substrate 40 is a flexible substrate composed of a resin film. As illustrated in FIG. 1, positioning holes 41 are formed at the four corners of the lower wiring substrate 40. The positioning holes 41 are fit with the corresponding positioning units 11 of the lower frame 10 to position the lower wiring substrate 40 on the bottom surface 10a.

As illustrated in FIG. 1, the lower wiring substrate 40 is vertically (in the Z1-Z2 direction) symmetrical to the upper wiring substrate 50. The lower wiring substrate 40 has a notch 42 in the center area. A first middle connecting part 43a and a second middle connecting part 43b are integrated with the lower wiring substrate 40 and extend into the notch 42. Leads are disposed on the upward (Z1 side) surfaces of the first middle connecting part 43a and the second middle connecting part 43b. An electrode 45a is disposed at the tip of the first middle connecting part 43a, and an electrode 45b is disposed at the tip of the second middle connecting part 43b.

A first end connecting part 43c and a third end connecting part 43e are disposed on the Y1 side of the notch 42. A second end connecting part 43d and a fourth end connecting part 43f are disposed on the Y2 side. Leads are provided on the Z1-side surfaces of the end connecting parts 43c, 43d, 43e, and 43f. The electrodes 45c, 45d, 45e, and 45f are disposed at the tips.

Similar to the leads on the upper wiring substrate 50, the leads on the lower wiring substrate 40 are corresponding copper and/or silver patterns. Similar to the electrodes 55a, 55b, 55c, 55d, 55e, and 55f of the upper wiring substrate 50, the electrodes 45a, 45b, 45c, 45d, 45e, and 45f are composed of binder resin and carbons.

As illustrated in FIG. 1, the lower wiring substrate 40 underlies the dot driving unit 30, and the lower frame 10 underlies the lower wiring substrate 40. Fixing screws are passed through the four fixing holes 11a in the lower frame 10 and the twelve fixing holes 14. The fixing screws are screwed into corresponding internal threads 22a and 23e to fix the lower frame 10 to the upper frame 20.

As a result, the lower pushing part 13a of the first middle resilient part 12a in the lower frame 10 causes the tip of the first middle connecting part 43a of the lower wiring substrate 40 to push against the end 36 of the first middle actuator 32a. As a result, the electrode 45a at the tip of the first middle connecting part 43a pushes against the plate surface 35a of the second electrode layer 35 of the first middle actuator 32a. The lower pushing part 13b of the second middle resilient part 12b causes the tip of the second middle connecting part 43b of the lower wiring substrate 40 to push against the end 36 of the second middle actuator 32b.

At the same time, the lower pushing part 13c of the first end resilient part 12c in the lower frame 10 causes the first end connecting part 43c of the lower wiring substrate 40 to push against the end 36 of the first end actuator 32c. The lower pushing part 13d of the second end resilient part 12d, the lower pushing part 13e of the third end resilient part 12e, and the lower pushing part 13f of the fourth end resilient part 12f respectively cause the electrode 45d of the second end connecting part 43d, the electrode 45e of the third end connecting part 43e, and the electrode 45f of the fourth end connecting part 43f to push against the end 36 of the second end actuator 32d, the end 36 of the third end actuator 32e, and the end 36 of the fourth end actuator 32f, respectively.

FIG. 5 illustrates the electrode 45d of the second end connecting part 43d being pushed against the plate surface 35a of the end 36 of the second end actuator 32d by the lower pushing part 13d of the second end resilient part 12d.

As illustrated in FIG. 5, the electrode 55d at the tip of the second end connecting part 53d of the upper wiring substrate 50 is in close contact with the upper-side (Z1-side) plate surface 34a of the end 36 of the second end actuator 32d. The electrode 45d at the tip of the second end connecting part 43d of the lower wiring substrate 40 is in close contact with the lower-side (Z2-side) plate surface 35a of the end 36. The resilient force of the second end resilient part 12d on the lower frame 10 firmly holds the end portion of the second end actuator 32d between the lower frame 10 and the upper frame 20.

As illustrated in FIG. 6, the actuator 32 is composed of a polymer impregnated with ionic liquid. The first electrode layer 34 and the second electrode layer 35 are composed of polymers mixed with carbon nanotubes. The electrode layers 34 and 35 also contain ionic liquid. As illustrated in FIG. 5, at the end 36 of the second end actuator 32d, the lead of the upper wiring substrate 50 is not in direct contact with the first electrode layer 34, but the electrode 55d containing carbon is interposed therebetween. Thus, the lead of the upper wiring substrate 50 can be prevented from being altered by the ionic liquid contained in the actuator. Since the electrode 45d on the lower wiring substrate 40 is in contact with the lower surface of the actuator, similarly, the lead of the lower wiring substrate 40 can be prevented from being altered.

As illustrated in FIG. 5, the end 36 of the second end actuator 32d is held by the lower frame 10 and the upper frame 20, but other parts of the second end actuator 32d are in a free state. A space that allows bending exists between the second end actuator 32d and the lower frame 10, and a space that allows bending exists between the second end actuator 32d and the upper frame 20. Thus, the second end actuator 32d can bend largely upward and downward. Since the second end actuator 32d can be bent in the direction opposite to the direction the projection 31 is pushed, if required, accumulation of warpage in a specific direction can be prevented.

As illustrated in FIG. 5, the area A1 of the lower pushing part 13d of the lower frame 10 pushing the second end actuator 32d is larger than the area A2 of the upper pushing part 25d of the upper frame 20 holding the second end actuator 32d. Thus, the resistance against the support part of the end 36 in response to the tip 37 of the second end actuator 32d bending upward (in the Z1 direction) can be decreased. Accordingly, the second end actuator 32d easily bends upward, and thus, the projection 31 is easily pushed outside the upper frame 20.

The characteristics of the support structure of the actuator illustrated in FIG. 5 is the same for the first middle actuator 32a, the second middle actuator 32b, the first end actuator 32c, the third end actuator 32e, and the fourth end actuator 32f.

The tactile display device 1 first selects and pushes out the projections 31 in the first dot matrix M1, which are positioned at the holes 21 of the display section D1, which is illustrated in FIG. 1. Such control is achieved by selecting at least one of the six actuators 32a, 32b, 32c, 32d, 32e, and 32f in the first dot matrix M1 and supplying electricity. As illustrated in FIG. 6, a voltage is applied to the first electrode layer 34 and the second electrode layer 35 of a selected actuator 32 such that the first electrode layer 34 is positively charged. As a result, cations move toward the second electrode layer 35, and the second electrode layer 35 swells largely, causing the actuator 32 to bend in the direction indicated by the dotted line. Such a bending force causes the projection 31 to protrude from the contact surface 20a of the upper frame 20. A Braille letter is displayed by at least one of the six protruding dots in the display section D1.

Another Braille letter is displayed by driving the second dot matrix M2 in the second display section D2. Such driving is performed in sequence on the display sections D3, D4, D5, and D6. The user can obtain information by running his/her finger across the contact surface 20a in the X1 direction. Once the finger reaches the display section D6, the user can return his/her finger to the display section D1 and run his/her finger in the X1 direction again. By repeating this action, a large amount of Braille information can be obtained by the users, such as the visually impaired.

Figure 7:
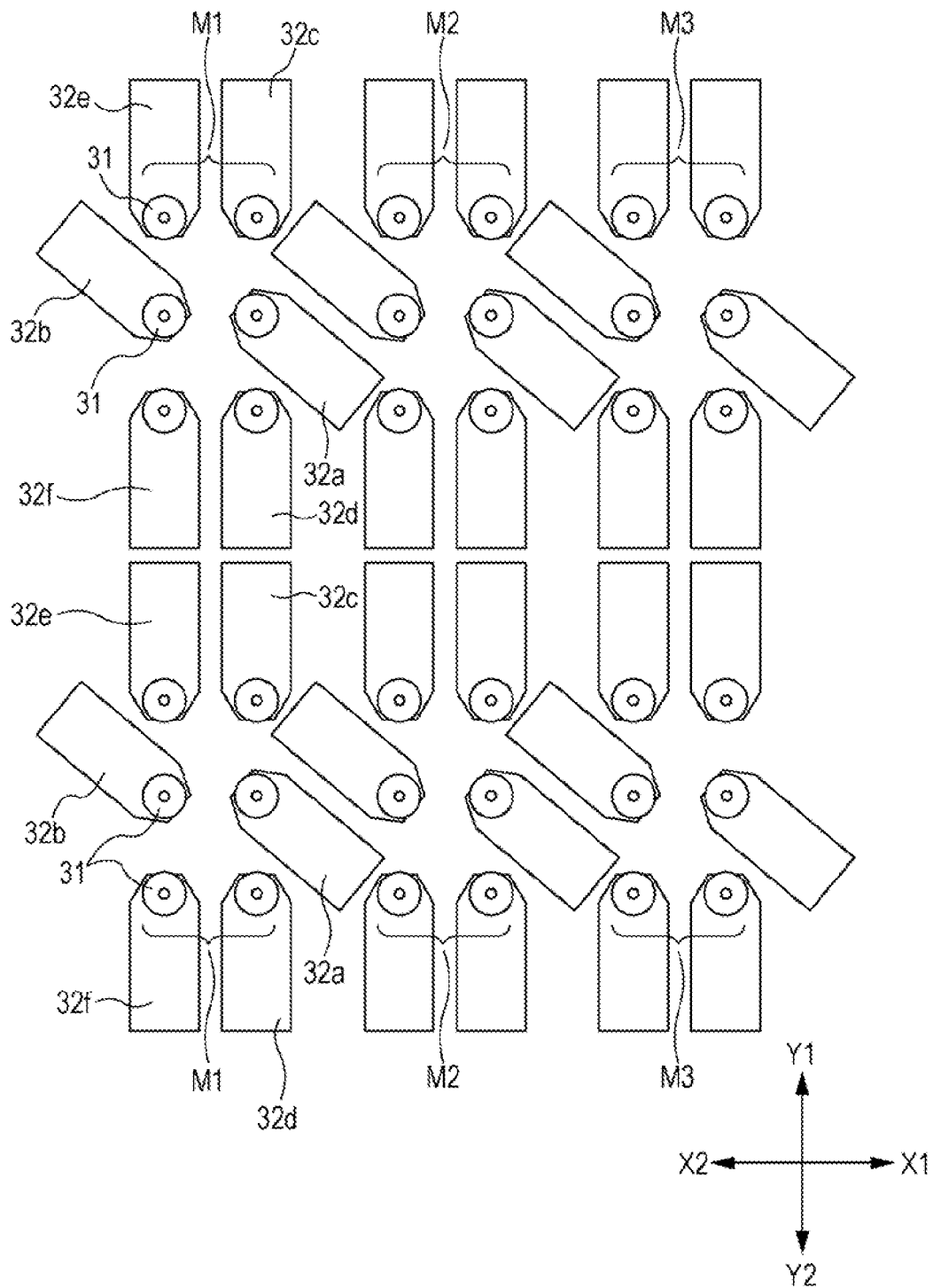
FIG. 7 is a plan view of the arrangement of the projections and the actuators in a tactile display device according to another embodiment of the present invention.

As illustrated in FIG. 7, the dot matrices M1 and M2 can be aligned in both the X and Y directions. Since the actuators 32 in each dot matrix can be arranged highly densely, the dot matrix can be disposed closely to other dot matrices in the longitudinal and lateral directions even with the actuators 32 have a planar arrangement. The amount of information provided by the tactile display can be increased by arranging the dot matrices in the longitudinal and lateral directions.

What is claimed is:

1. A tactile display device comprising:
   a casing including a lower frame and an upper frame attached to each other, the lower frame having lower pushing parts provided on an inner surface thereof, and the upper frame having upper pushing parts provided on an inner surface thereof;
   a plurality of projection members configured to protrude from the surface of the casing, the plurality of projection members forming a tactile display;
   a plurality of membrane actuators, each being displaceable in a thickness direction and configured to move corresponding one of the projection members to protrude from the surface of the casing, the plurality of membrane actuators being arranged such that respective surfaces thereof are in a plane intersecting with a projection direction of the projection members, each of the membrane actuators having first and second electrode layers disposed on upper and lower surfaces thereof, respectively;

a lower wiring substrate having a plurality of lower electrodes thereon, the lower wiring substrate being provided between the membrane actuators and the lower frame such that each of the lower electrodes is electrically connected to the second electrode layer of corresponding one of the membrane actuators at a base end thereof;

an upper wiring substrate having a plurality of upper electrodes thereon, the upper wiring substrate being provided between the membrane actuators and the upper frame such that each of the upper electrodes is electrically connected to the first electrode layer of the corresponding one of the membrane actuators at the base end thereof, wherein the base ends of the membrane actuators are held between the lower pushing parts and the corresponding upper pushing parts.

2. The tactile display device according to claim 1, wherein the lower wiring substrate includes a flexible substrate and deformable connecting parts, the upper wiring substrate includes a flexible substrate and deformable connecting parts, and the connecting parts of the lower wiring substrate are interposed between the base ends of the membrane actuators and the lower pushing parts, and the connecting parts of the upper wiring substrate are interposed between the base ends of the membrane actuators and the upper pushing parts.

3. The tactile display device according to claim 1, wherein at least one of the lower frame and the upper frame is integrated with a resilient part, and the lower pushing parts or the upper pushing parts are disposed on the resilient part.

4. The tactile display device according to claim 1, further comprising:

a plurality of housing portions provided on the inner surface of at least one of the lower frame and the upper frame, wherein the membrane actuators are disposed inside the housing portions such that movement of the membrane actuators in a width direction is restricted.

5. The tactile display device according to claim 1, wherein an area of the lower pushing parts holding the base ends of the membrane actuators differs from an area of the upper pushing parts holding the base ends of the membrane actuators.

6. The tactile display device according to claim 5, wherein the area of the lower pushing parts holding the base ends of the membrane actuators is larger than the area of the upper pushing parts holding the base ends of the membrane actuators.

7. The tactile display device according to claim 1, wherein the membrane actuators are polymeric actuators containing ionic liquid therein.

8. The tactile display device according to claim 7, wherein each of the upper and lower electrodes has a conductive layer containing carbon.

9. The tactile display device according to claim 1, wherein the lower wiring substrate and the upper wiring substrate are independent substrates.

10. The tactile display device according to claim 1, wherein the lower wiring substrate and the upper wiring substrate are formed in one flexible body.

11. The tactile display device according to claim 1, wherein the lower pushing parts face the corresponding upper pushing parts such that the lower wiring substrate, the lower electrode, the base end of the actuator, the upper electrode, and the lower wring substrate are interposed therebetween.

* * * * *